US008924662B2

(12) United States Patent
Hughes

(10) Patent No.: US 8,924,662 B2
(45) Date of Patent: Dec. 30, 2014

(54) CREDIT-BASED STORAGE DEVICE FLOW CONTROL

(75) Inventor: Brian William Hughes, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1781 days.

(21) Appl. No.: 12/100,013

(22) Filed: Apr. 9, 2008

(65) Prior Publication Data

US 2008/0189504 A1 Aug. 7, 2008

Related U.S. Application Data

(62) Division of application No. 11/032,769, filed on Jan. 10, 2005, now Pat. No. 7,380,080.

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0656* (2013.01); *G06F 3/0619* (2013.01); *G06F 3/0671* (2013.01)
USPC ........................................................ 711/159

(58) Field of Classification Search
None
See application file for complete search history.

(56) References Cited

U.S. PATENT DOCUMENTS

| 5,892,979 | A | * | 4/1999 | Shiraki et al. | 710/52 |
| 2002/0124102 | A1 | * | 9/2002 | Kramer et al. | 709/234 |
| 2002/0146023 | A1 | * | 10/2002 | Myers | 370/412 |
| 2006/0075007 | A1 | * | 4/2006 | Anderson et al. | 707/206 |

* cited by examiner

*Primary Examiner* — Jared Rutz
*Assistant Examiner* — Marwan Ayash
(74) *Attorney, Agent, or Firm* — Klass, Law, O'Meara & Malkin, P.C.; Guy K. Clinger

(57) ABSTRACT

A method for controlling data flow to a pair of storage devices includes receiving at least one new entry to store in a first storage device or a second storage device in the pair of storage devices and determining a number of entries made to the first and second storage devices out of the at least one new entry. The method also includes calculating a difference between available space in the first storage device and the second storage device, and calculating a number of credits used by the at least one new entry based on the numbers of entries to the first and second storage devices and on the difference in available space.

19 Claims, 6 Drawing Sheets

CREDIT-BASED STORAGE DEVICE FLOW CONTROL

CROSS-REFERENCE TO RELATED APPLICATIONS

This application is a divisional of U.S. patent application Ser. No. 11/032,769 which is hereby incorporated by reference for all that is disclosed therein.

BACKGROUND

Most modern electronic devices contain memory for storing data either temporarily or long-term, such as televisions that store the last channel viewed, cellular telephones that store telephone numbers and information about incoming calls, etc. A wide variety of memory systems are known, such as random-access memories and stack-type memories. Each type of memory system has strengths and weaknesses and is used in different types of applications. For example, random-access memories are commonly used when a great deal of storage space is required and each piece of data must be individually accessible at any time. A random-access memory requires relatively complex addressing circuitry, enabling each piece of data to be addressed and retrieved at any time, in any order.

For other applications, simpler memory systems may be acceptable or desirable. One such memory system is a stack-type memory, in which data is sequentially stored in a list and retrieved in a predetermined order, rather than each piece of data being individually addressable and accessible at any time. As data is written into the stack-type memory, it fills the memory as if adding to a stack or pile of data. As data is read out of the stack-type memory, it empties the memory as if removing items from the stack, leaving room for more data to be written. A typical stack-type memory is a first-in first-out (FIFO) memory, in which the first piece of data written to an input of the FIFO will be the first piece of data read back from an output of the FIFO. A common application for stack-type memory systems is as a communications buffer between two electronic circuits. If the first electronic circuit sends a stream of data to the second electronic circuit, the second typically must, temporarily store or buffer the data as it arrives, until it is ready to use the data. If the second electronic circuit uses the data in the order in which it is received, there is typically no need to randomly access the pieces of data in any other order, and a FIFO is a simple and inexpensive storage device fitting these requirements.

One disadvantage of a stack-type memory is that it can overflow and lose data if it continues to receive data after becoming full, before any data is read from the memory to free up space.

SUMMARY

An exemplary embodiment may comprise a method for controlling data flow to a pair of storage devices, the method including receiving at least one new entry to store in a first storage device or a second storage device in the pair of storage devices, and determining a number of entries made to the first and second storage devices out of the at least one new entry. The method also includes calculating a difference between available space in the first storage device and the second storage device, and calculating a number of data storage credits used by the at least one new entry based on the numbers of entries to the first and second storage devices and on the difference in available space.

BRIEF DESCRIPTION OF THE DRAWINGS

Illustrative embodiments are shown in the accompanying drawings as described below.

DESCRIPTION

Figure 1:
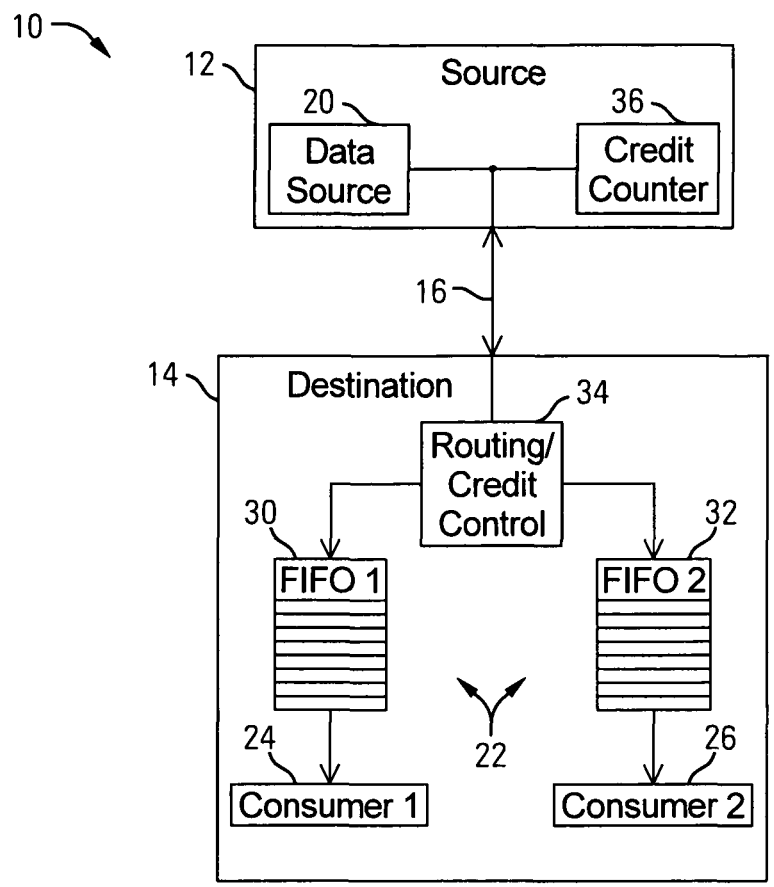
FIG. 1 is a block diagram of an exemplary source and destination illustrating data flow.

The drawing and description, in general, disclose a method and apparatus for controlling the flow of data to a pair of storage devices. In one exemplary embodiment, the pair of storage devices comprise stack-type memories such as first-in first-out (FIFO) memories. A credit counter contains the number of credits representing empty spaces or slots in the storage devices. Data is stored in the storage devices only if the credit counter contains sufficient credits, thereby preventing the storage devices from overflowing and discarding data.

An exemplary system 10 containing such a credit counter and pair of storage devices is illustrated in FIG. 1. Data is transmitted between a source 12 and a destination 14 over any suitable type of connection 16, such as a direct cable connection, network connection, wireless connection, etc. The source 12 contains a data source 20, from which data is sent to a pair of storage devices 22 in the destination 14. The destination 14 contains two consumers 24 and 26 for the data transmitted from the source 12. This data is buffered for the two consumers 24 and 26 by the pair of storage devices 22, FIFO 1 30 and FIFO 2 32.

Data from the source 12 is directed to the appropriate storage device, either FIFO 1 30 or FIFO 2 32, corresponding to the destination consumer 24 or 26, by a router 34. This function may be performed in any suitable manner, at least partly dependent upon the type of connection 16 and architecture in the system 10. For example, data may be transferred from the source 12 to the destination 14 using a bus architecture in which data packets include header information identifying the destination consumer 24 or 26. The router 34 also includes a credit controller, to be described in detail below, for controlling the contents of a credit counter 36 in the source 12.

In the exemplary embodiment, the source 12 is unaware of many details about the memory in the destination 14, including whether it contains one or more storage devices, the type of storage devices, etc. The credit counter 36 enables the source 12 to track the amount of free space in the destination 14. It is initialized with the amount of available storage space in the destination 14 in any suitable manner. For example, the credit counter 36 may be hard-coded with the available storage space in the destination 14, or the router/credit control device 34 in the destination 14 may transmit an indication of the amount of available storage space to initialize the credit counter 36.

In the exemplary embodiment, data is divided into blocks, referred to herein as entries, each of which requires one credit to store in the destination 14. The entries have the same width or number of bits as the FIFOS 30 and 32, so each entry fits into one empty slot in the FIFOS 30 or 32. However, the method and apparatus for controlling the flow of data to a pair of storage devices is not limited to this configuration, and may be adapted to any suitable division of data, as long as a fixed ratio may be established between credits and whatever unit of data is selected, or if the relationship between entries and credits may be otherwise established.

During operation of the system 10, for each data entry transmitted from the source 12 to the destination 14, the credit counter 36 is decremented by one, indicating that the available storage space in the destination 14 has just been reduced. This decrementing may be performed by either the source 12 or the destination 14. For example, the source 12 may decrement the credit counter 36 each time it transmits a data entry from the data source 20 to the destination 14. Alternatively, the destination 14 may transmit an indication that the credit counter 36 should be decremented for each data entry received. As will be described in detail below, not all transmitted data entries use a credit, and the method and apparatus for controlling the flow of data to a pair of storage devices enables the return of unused credits to the credit counter 36. Accordingly, in this alternative embodiment, the destination 14 may combine the functions of decrementing the credit counter 36 and the return of unused credits by controlling the decrementing of the credit counter 36 and only decrementing for each used credit after a data transmission from the source 12.

If the destination 14 contained only one storage device, controlling data flow with the credit counter 36 would be relatively simple, because every entry transmitted would use one credit. However, in the system 10 having a pair of storage devices 22, not all data entries from the source 12 use a credit. This is because the credit counter is initialized only with the available storage space of one of the pair of FIFOS 30 and 32 in the destination 14, and the FIFOS 30 and 32 do not necessarily fill evenly. Therefore, entries that overlap in corresponding slots in the FIFOS do not use credits. This overlap is comprised of two components: "catch-up" entries, or entries that bring the number of existing entries in the less-full FIFO to the number in the more-full FIFO, and "redundant" entries, or entries that are added to the less-full FIFO at the same time entries are being added to the more-full FIFO in corresponding slots, such that the more-full FIFO remains at least as full as the less-full FIFO. (Catch-up and redundant entries are graphically depicted in FIGS. 8-10, described below.)

Because the source 12 is not aware that the destination 14 contains a pair of FIFOS 30 and 32, the credit counter 36 is initialized with the available space of only one FIFO (e.g. 30). If the FIFOS 30 and 32 have different capacities, the credit counter 36 is initialized with the available space of the smaller of the two. If the credit counter 36 were initialized with the available space of both FIFOS 30 and 32 combined, and all or most entries were stored in one of the FIFOS (e.g., 30), that FIFO (e.g., 30) would overflow and data would be lost. Similarly, if the FIFOS 30 and 32 have different capacities, and the credit counter 36 were initialized with the available space of the larger of the two (e.g., 32), and all or most entries were stored in the smaller (e.g., 30), the smaller FIFO (e.g., 30) would likely overflow and data would be lost.

Figure 2:
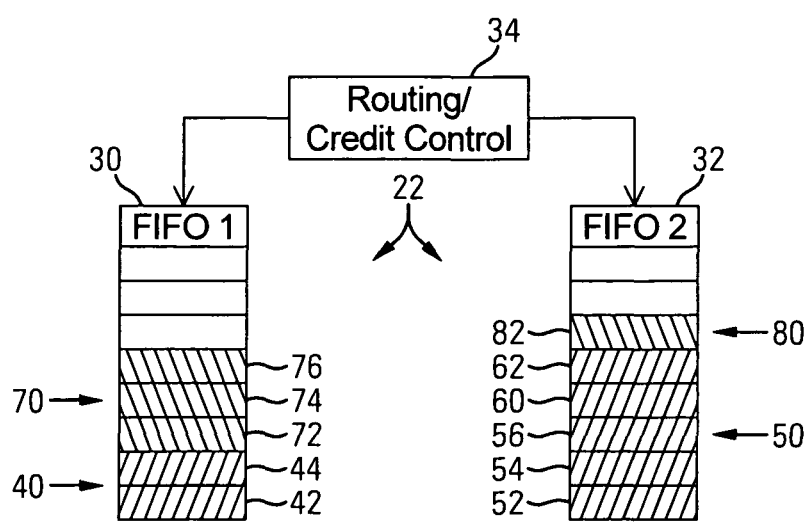
FIG. 2 is a block diagram of a portion of the exemplary destination of FIG. 1.

This may be best understood with reference to the exemplary entries illustrated in FIG. 2, in which both FIFOS 30 and 32 have eight slots each. The credit counter 36 is therefore originally initialized with a value of eight. Both FIFO 1 30 and FIFO 2 32 contain existing entries 40 and 50, respectively, before new entries 70 and 80 are transmitted. FIFO 1 30 contains two existing entries 42 and 44, and FIFO 2 contains five existing entries 52, 54, 56, 60 and 62. At this point, the credit counter 36 would contain a value of three, the remaining available space in the FIFO 32 that has the least remaining space, or is fullest. The process of correctly setting the credit counter 36 will now be explained with respect to a group of new entries 70 and 80. The router/credit controller 34 directs three of the new entries 72, 74 and 76 to FIFO 30. However, because FIFO 2 32 is already fuller than these new entries 72, 74 and 76 make FIFO 1 30, these new entries 72, 74 and 76 do riot use any credits from the credit counter 36. This type of entry is referred to herein as a "catch-up entry", because the entries are just filling space in the less-full storage device to catch up to the filled level of the fuller storage device. If the source 12 sent four credits with the data, the router/credit controller 34 should return three credits to the credit counter, corresponding to the catch-up entries 72, 74 and 76. The router/credit controller 34 directs the fourth 82 of the new entries to FIFO 2 32. Because this storage device has less remaining space, his entry 82 does use a credit, so the fourth credit is not returned to the credit counter 36.

Note that in the example illustrated in FIG. 2, multiple entries 70 and 80 were transmitted to the destination 14 simultaneously. Data transfer operations in the exemplary system 10 are divided into cycles, wherein one or more entries is transmitted from the source 12 to the destination 14, and the credit counter 36 is updated according to those entries by decrementing and incrementing for transmitted and unused credits, respectively. (Credits may be "transmitted" either explicitly, by transmitting a number of credits by which the credit counter 36 has been decremented, or implicitly, by transferring a number of entries and decrementing the credit counter 36 accordingly.) In the exemplary system 10, the source 12 is configured to transfer no more than a predetermined maximum number of entries in one cycle, based on how many entries the destination 14 can process simultaneously. In the exemplary embodiment, the FIFOS 30 and 32 have multiple input ports for storing multiple entries simultaneously. The descriptions given herein will be directed to FIFOS 30 and 32 having four input ports each. The source 12 is therefore configured to transmit no more than four entries per cycle (e.g., 72, 74, 76 and 82), in case all four entries are sent to a single FIFO (e.g., 30).

In alternative embodiments, simultaneous transmission of multiple entries may be handled in any other suitable manner, such as queuing up entries for storage one by one in a single cycle into a single input port on a storage device, etc. The system 10 described herein is purely exemplary, and the method and apparatus for controlling the flow of data to a pair of storage devices is not limited to this configuration. For example, entries may be transmitted on a parallel or serial bus, storage devices are not limited to any particular type of memory, the credit controller need not be combined with the router, etc. Although two consumers 24 and 26 are shown in the destination 14, the data from the storage devices 22 may be used in any desired fashion. The storage devices 22 need not have the same width or depth. It may be advantageous in some systems to have different size storage devices, if one of the storage devices is expected to receive more entries than the other. Other adaptations may be made along these lines to the method and apparatus for controlling the flow of data to a pair of storage devices without departing from the scope of the inventive concepts disclosed herein.

Figure 3:
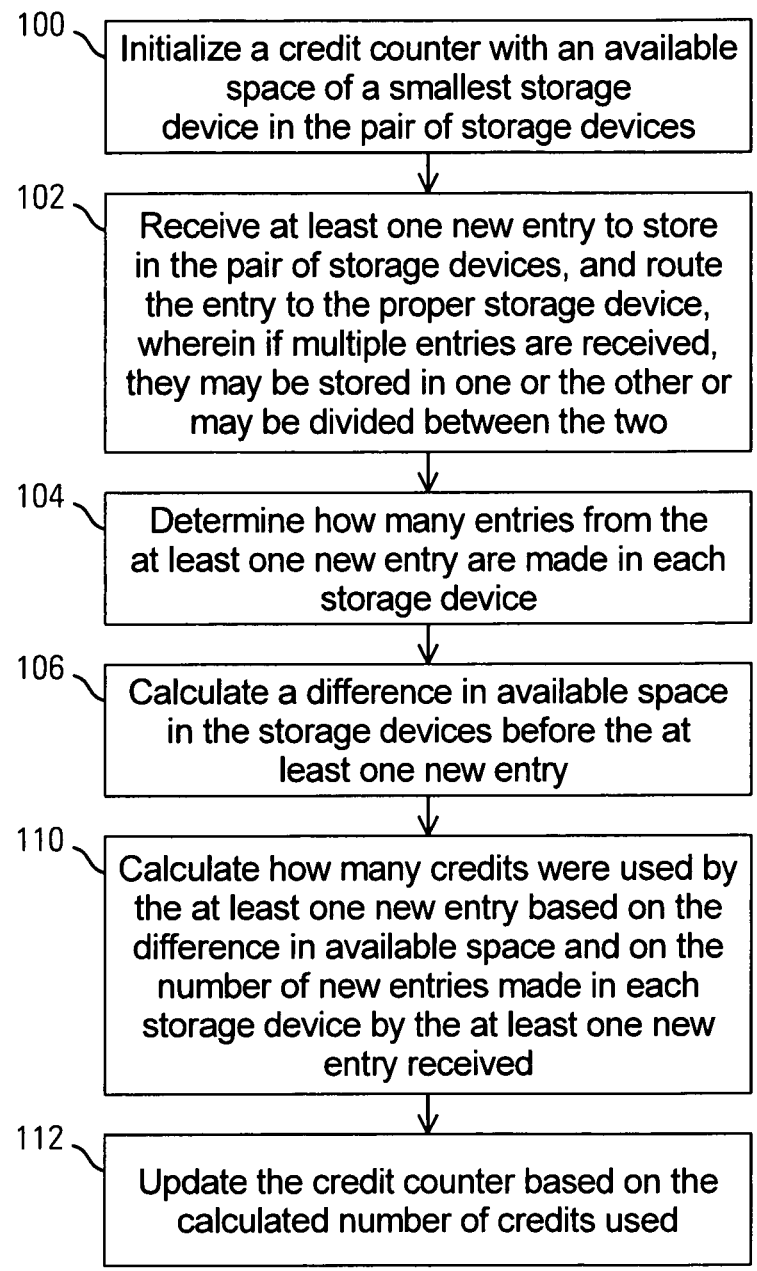
FIG. 3 is a flow chart of an exemplary operation for controlling the flow of data to a pair of storage devices using a single credit counter.

Referring now to FIG. 3, an exemplary process of controlling data flow to a pair of storage devices will be summarized. A credit counter is initialized 100 with an available space of a smallest storage device in the pair of storage devices. At least one new entry is received 102 to store in the pair of storage devices, and the entry is routed to the proper storage device. If multiple entries are received, they may be stored in one or the other or may be divided between the two. The number of entries made in each storage device from the at least one new entry is determined 104. A difference in available space in the storage devices before the at least one new entry is calculated 106. The number of credits used by the at least one new entry is calculated 110, based on the difference in available space and on the number of new entries made in each storage device by the at least one new entry received. The credit counter is updated 112 based on the calculated number of credits used.

The calculation of the difference in available space may be performed in a variety of manners. For example, the number of empty slots in one storage device may be subtracted from that of the other. Alternatively, the number of entries in one storage device may be subtracted from that of the other. In this embodiment, if the storage devices have different capacities, the number of entries in the larger storage device should be normalized to that of the smaller storage device. These various approaches to calculating the available space of the storage devices should be viewed as equivalent, because they are merely different ways of calculating the same quantity, from various points of view. Accordingly, although some exemplary embodiments described herein identify less-full and more-full storage devices and other exemplary embodiments identify storage devices having more available space and less available space, these approaches are equivalent. The more-full storage device is the same as the storage device having less available space. The less-full storage device is the same as the storage device having more available space, and this storage device would be the one receiving catch-up and redundant entries.

Figure 4:
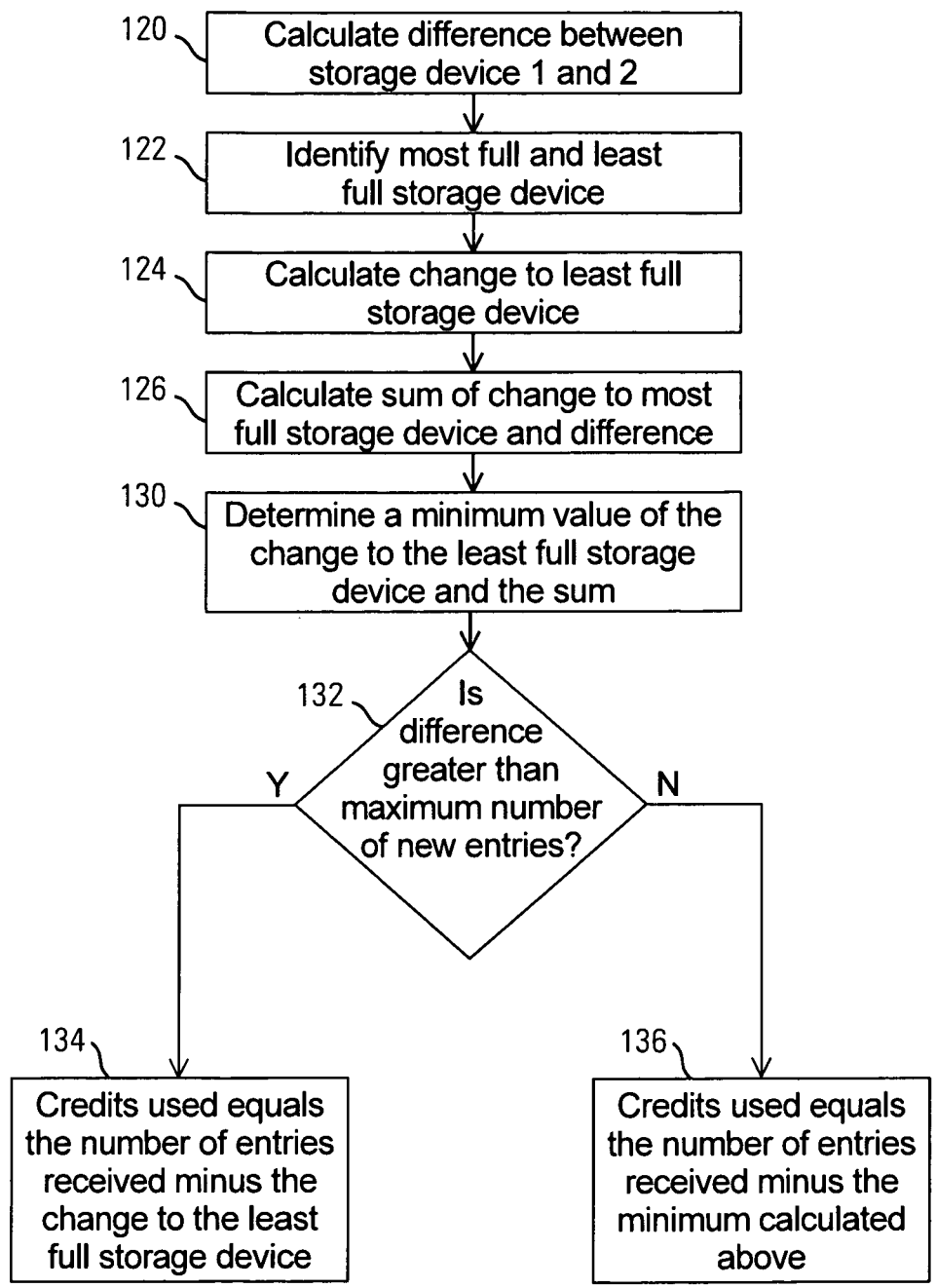
FIG. 4 is a flow chart of an exemplary operation for calculating the number of credits used for one or more entries received during a calculation cycle.

An exemplary operation for calculating 110 the number of used credits is summarized in the flow chart of FIG. 4. The difference in free space between storage device 1 and 2, before the storage of newly received entries, is calculated 120. As discussed above, this may be performed in any suitable manner. The most full and least full storage devices are identified 122 in the pair of storage devices. The change to the least full storage device due to newly received entries is calculated 124. The sum of the change to the most full storage device and the difference in free space is calculated 126. A minimum value is determined 130 between the sum calculated 126 previously and the change to the least full storage device. If 132 the difference is greater than the maximum number of new entries that can be received in a single cycle, the number of credits used equals 134 the number of entries received minus the change to the least full storage device. If 132 the difference is not greater than the maximum number of new entries, the number of credits used equals 136 the number of entries received minus the minimum calculated 130 above.

Several exemplary embodiments of an apparatus for controlling data flow to a pair of storage devices will now be described generally to illustrate various adaptations that may be made, before describing an exemplary embodiment in detail.

As mentioned above, the credit counter 36 can be managed in a variety of suitable manners, such as returning an indication of unused credits, or transferring a number of used credits. These should be viewed as equivalent, because they are simply different ways of measuring the same quantity. For example, referring now to FIG. 5, a block diagram of an exemplary apparatus is illustrated that calculates the number of unused credits for a data transmission in one cycle. The apparatus includes an element 150 that calculates the sum of the change to the more-full storage device and the difference in free space of the storage devices. Another element 152 calculates the change to the less-full storage device. The results of these two elements 150 and 152 are examined by a comparator 154 which outputs the lesser of the two results. A switch 156 outputs either the output of the comparator 154 or the output of the calculator 152 of the change to the less-full storage device. The output of this switch 156 carries the number of unused credits 160 for a group of new data entries. The switch 156 is actuated by a measure of the difference in free space in the storage devices. If the difference is greater than the maximum number of entries for one cycle, the switch 156 sets the number of unused credits 160 equal to the change to the less-full storage device, because the new entries were all catch-up entries. If the difference is not greater than the maximum number of entries for one cycle, the switch 156 sets the number of unused credits 160 equal to the output of the comparator 154, which is based on catch-up entries and redundant entries and on new entries which use credits.

Figures 5, 6:
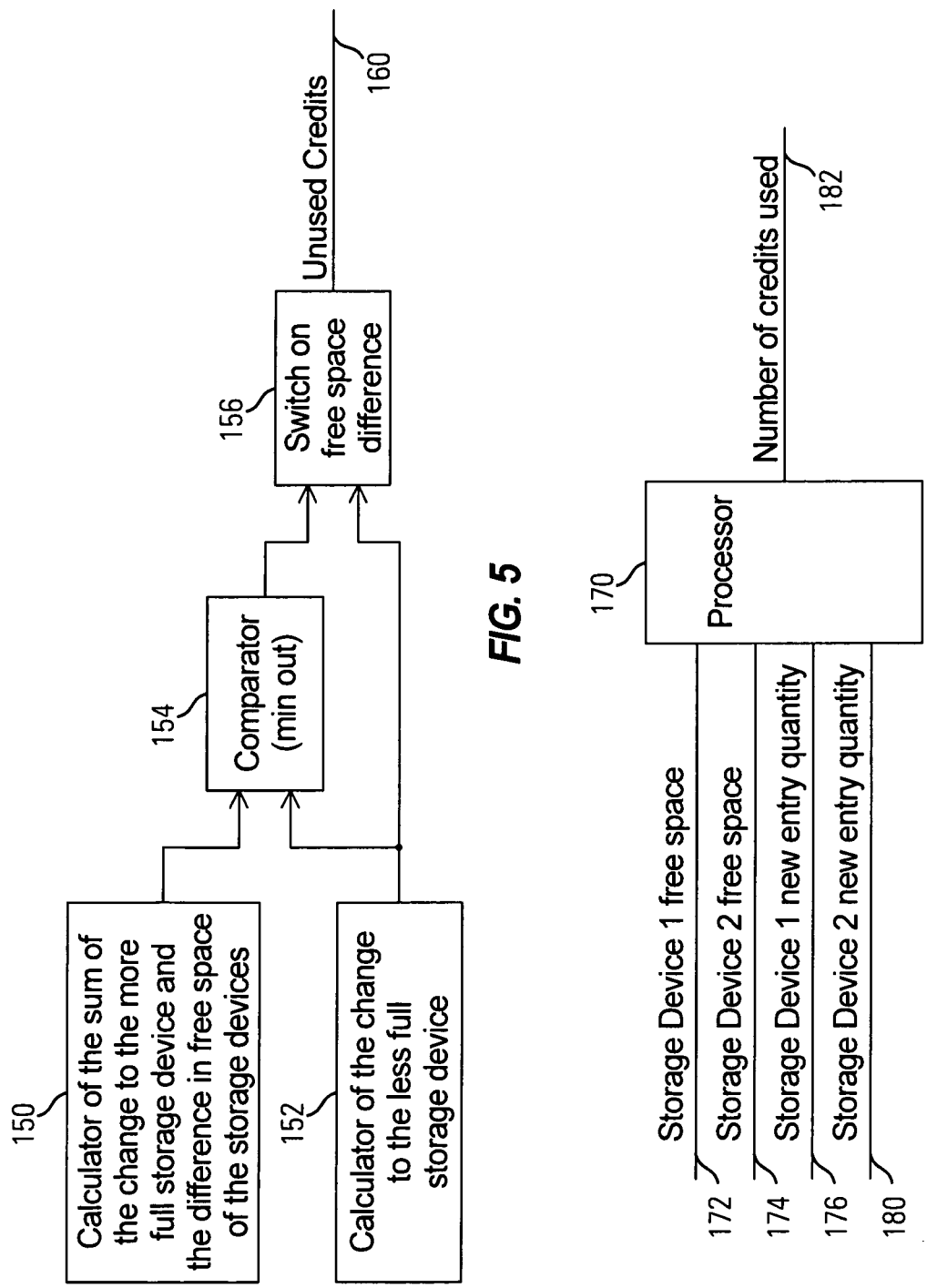
FIG. 5 is a block diagram of an exemplary apparatus for controlling data flow between a source and a destination by calculating the number of unused credits for a data transmission.
FIG. 6 is a block diagram of an exemplary processor-based apparatus for controlling data flow between a source and a destination by calculating the number of credits used by a data transmission.

In another exemplary embodiment illustrated in FIG. 6, the apparatus generates the number of used credits rather than the number of unused credits. In this embodiment, the process for calculating the number of unused credits is implemented by a processor 170 executing software such as embedded firmware. A number of inputs are provided to the processor 170, such as a measure 172 and 174 of the free space in the first and second storage devices, and the number 176 and 180 of new entries received for each storage device. The processor 170 calculates the number of credits used, using an algorithm such as that illustrated in the flowchart of FIG. 4, providing the number at an output 182 which may be used to update a credit counter.

Now that the method and apparatus for controlling the flow of data to a pair of storage devices has been described generally, including various alternative embodiments, an exemplary embodiment will be described in more detail. In this exemplary embodiment, the pair of storage devices is a pair of FIFOS of equal depth. An electrical circuit 200 (FIG. 7) will be described for calculating the number of unused credits for a data transmission in one cycle. The operation of the circuit 200 is defined according to the following equations:

$$M_{used\_norm}(n) = M_{used\_tot}(n) - L_{used\_tot}(n) \quad \text{EQ1}$$

$$M_{used\_norm}(n+1) = M_{used\_norm}(n) + M_{in}(n) \quad \text{EQ2}$$

$$L_{used\_norm}(n+1) = L_{used\_tot}(n+1) - L_{used\_tot}(n) = L_{in}(n) \quad \text{EQ3}$$

$$C' = \min(M_{used\_norm}(n+1), L_{used\_norm}(n+1)) \quad \text{EQ4}$$

The circuit 200 determines which of the FIFOS is more full and which is less full, with the more-full FIFO labeled M and the less-full FIFO labeled L in equations 1-4. When the FIFOS have an equal amount of free space, it does not matter which is designated M and which is L, and the circuit should be designed to designate one of the FIFOS as M by default.

The terms of the equations and used in the exemplary circuit 200 have the following meanings:
n=current cycle, during which new entries arrive
n+1=next cycle, after entries arriving during cycle n have been stored in FIFOS
L=less-full FIFO
M=more-full FIFO
$M_{used\_tot}(n)$=The total number of entries in the more-full FIFO at cycle n, before new entries are stored.
$M_{used\_norm}(n)$=The number of entries used in the more-full FIFO at cycle n, normalized to the number of entries used in the less-full FIFO at time n. This quantity is a measure of the difference in free space in the FIFOS, or of the difference in the number of entries in the FIFOS if they are of equal depth.
$M_{used\_norm}(n+1)$=The number of entries used in the more-full FIFO at cycle n+1, normalized to the number of entries used in the less-full FIFO at cycle n. Terms in these equations are normalized by subtracting the number of entries used in the less-full FIFO at cycle n. For example, if the more-full FIFO contained 63 entries at cycle n+1 and the less-full FIFO contained 60 entries at cycle n, $M_{used\_norm}$(n+1) would be (63-60) or 3 entries.
$L_{used\_tot}(n)$=The total number of entries in the less-full FIFO at cycle n.
$L_{used\_tot}(n+1)$=The total number of entries in the less-full FIFO at time n+1.
$L_{used\_norm}(n+1)$=The number of entries used in the less-full FIFO at cycle n+1, normalized to $L_{used\_tot}(n)$.
$M_{in}(n)$=The number of entries stored in the more-full FIFO during cycle n.
$L_{in}(n)$=The number of entries stored in the less-full FIFO during cycle n.
C'=The number of unused credits to return based on the transaction at cycle n, as calculated without a bypass path, to be discussed below. This value may be invalid if the difference between the number of entries in FIFO 1 and FIFO 2 is greater than the maximum possible number of entries received in one cycle.
C=The number of unneeded credits to return based on the transaction at time n, as calculated with a bypass path. This value is valid even if the difference between the number of entries in FIFO 1 and FIFO 2 is greater than the maximum possible number of entries received in one cycle.

Figure 7:
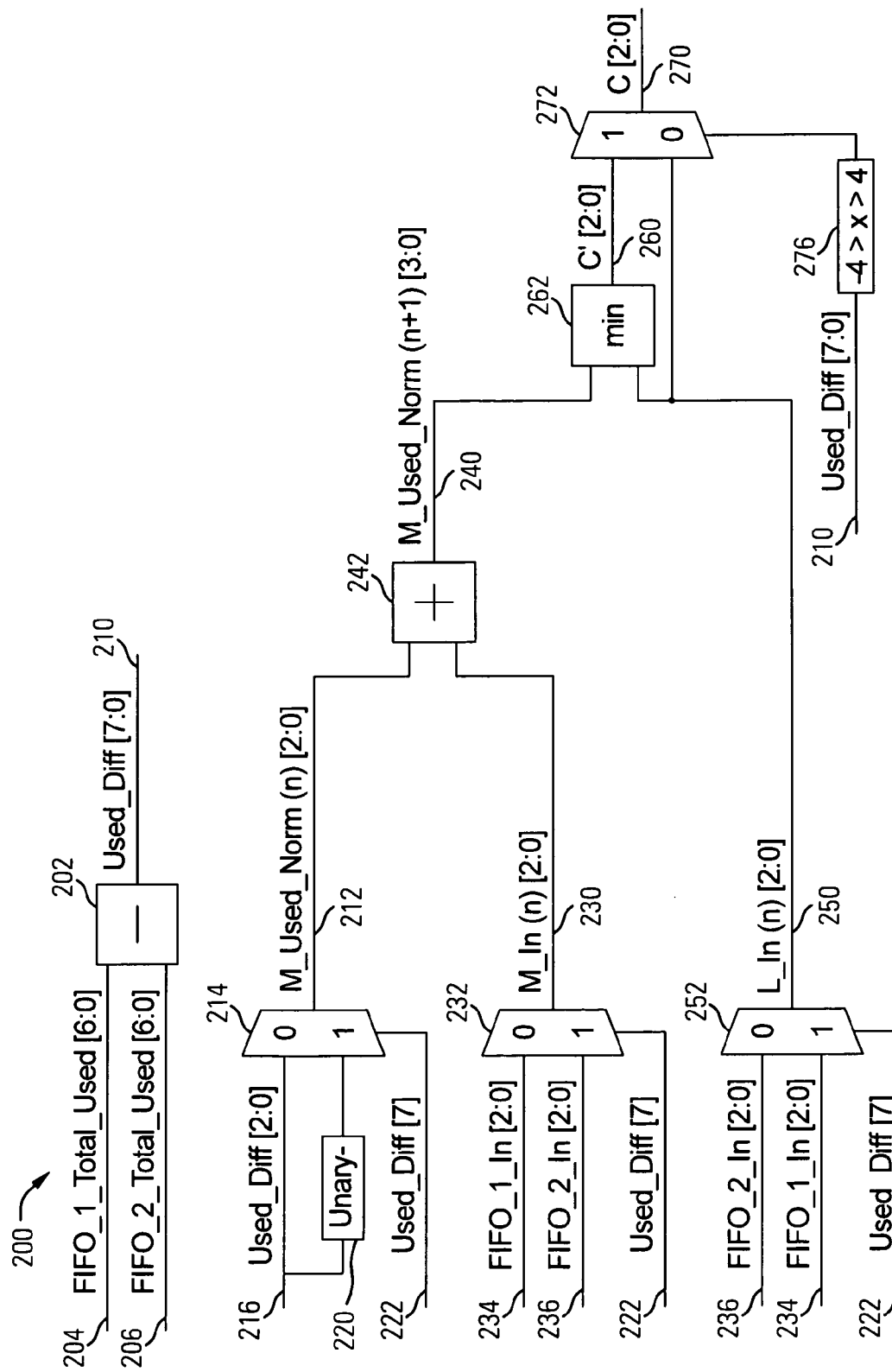
FIG. 7 is an exemplary circuit for controlling data flow between a source and a destination by calculating the number of unused credits for a data transmission.

The exemplary embodiment of a circuit 200 to calculate unused credits for data entries received during one cycle is illustrated in FIG. 7, and equations 1-4 will be described with reference to the circuit 200. The circuit 200 is designed to control data flow to two FIFOS with 120 entry slots each and four input ports each. Therefore, the maximum number of entries that may be received for storage in the two FIFOS in one cycle is four.

A subtraction element 202 produces the Used_Diff signal 210 by subtracting one input, FIFO_2_Total_Used 206, from the other, FIFO_1_Total_Used 204. In other words, in this embodiment, the difference between the two FIFOS is calculated by subtracting the number of entries in one from the other. Note that the Used_Diff signal 210 will be negative if FIFO_2_Total_Used 206 is greater than FIFO_1_Total_Used 204, and positive otherwise. In this exemplary embodiment, the most significant bit of the Used_Diff signal 210 is 1 if it is negative, and 0 if it is positive or if the number of entries in the FIFOS was equal. This portion of the circuit 200 performs a calculation that is preliminary to equations 1-4 and is used to identify L and M, the less-full and more-full FIFOS, and to calculate the value of $M_{used\_norm}(n)$, the normalized number of entries used in the more-full FIFO M.

The number of bits included in each signal is indicated in square brackets after each signal name in FIG. 7. Because the FIFOS are each 120 data slots deep, the FIFO_1_Total_Used 204 and FIFO_2_Total_Used 206 signal each have 7 bits, bits 6:0. A 7 bit binary number can store up to the number 127, which is sufficient to represent the number of entries in a FIFO with 120 data slots. The Used_Diff signal 210 has 8 bits to store up to the number 127 with a sign bit in the most significant bit (MSB). (In the exemplary embodiment, numbers are represented using 2's complement notation.)

The $M_{used\_norm}(n)$ signal 212 is calculated using a switch, in this case a multiplexer 214, to obtain the absolute value of the Used_Diff signal 210. In the exemplary circuit 200, all switches are implemented using multiplexers having two data inputs, a data output, and a selector input. The first input is connected to a least significant portion 216 of the Used_Diff signal 210, and the second input is connected to an inverted version of the least significant portion 216 of the Used_Diff signal 210. The inversion is performed by a "Unary-" circuit element 220. The selector input of the multiplexer 214 is connected to the MSB 222 of the Used_Diff signal 210, which is 0 if the number of entries in FIFO 1 is greater than or equal to that in FIFO 2, and 1 if the number of entries in FIFO 1 is less than that in FIFO 2. The least significant portion 216 of the Used_Diff signal 210 is therefore passed through to become the $M_{used\_norm}(n)$ signal 212 if the Used_Diff signal 210 is positive; otherwise the inverted version of the least significant portion 216 of the Used_Diff signal 210 is passed through to become the $M_{used\_norm}(n)$ signal 212. This multiplexer 214 completes the calculation of equation 1, $M_{used\_norm}(n)$ 212=$M_{used\_tot}(n)$ (204 or 206)−$L_{used\_tot}(n)$ (206 or 204). The difference of FIFO 1 and FIFO 2 is calculated by the subtractor 202, and the M and FIFOS are identified using the MSB of the result 210 of the entry difference subtraction as the selector input for the multiplexer 214.

Note that the number of bits used in this portion of the circuit 200 and in the remainder of the circuit are greatly reduced from that in the subtracter 202. Only enough bits required to represent the maximum number of entries per cycle need be carried through most parts of the circuit 200, because the difference in entries or free space between the FIFOS is normalized. In this case, because only four entries may be received per cycle, and the number 4 can be represented using three bits in a base 2 or binary digital circuit, only the least significant three bits 216 of the Used_Diff signal 210 are used, and the $M_{used\_norm}(n)$ signal 212 accordingly only has three bits. The number of bits required in signals throughout the circuit 200 scales up with the maximum number of entries that can be received in one cycle, which in this case is set by the number of input ports per FIFO at four. This normalization of the difference between the FIFO contents provides a great benefit by reducing the size of the circuit 200 and ensuring that it scales up slowly. If the difference were not normalized, the number of bits needed throughout the circuit 200 would scale up with the depth of the FIFOS. However, by normalizing the difference, only the difference calculation portion 202 of the circuit 200 is dependent upon the FIFO depth and must scale up accordingly, and the remainder of the circuit 200 scales up according to the $\log_2$ of the maximum number of entries per cycle. However, because some information is lost by normalizing and discarding bits, the main path through the circuit 200 and a bypass path may generate invalid results if the difference is greater than the maximum number of entries per cycle and cannot be represented by the reduced number of bits. A bypass path is therefore provided to handle the cases when the difference is greater than the maximum number of entries per cycle, as will be described below.

The number of new entries received for the more full FIFO M, the $M_{in}(n)$ signal 230, is generated by multiplexer 232 having two inputs, the first connected to the FIFO_1_In signal 234 carrying the number of new entries received for FIFO 1, and the second connected to the FIFO 2_In signal 236 carrying the number of new entries received for FIFO 2. The selector input of the multiplexer 232 is connected to the MSB 222 of the Used_Diff signal 210. The $M_{in}(n)$ signal 230 is therefore set to the number of new entries in FIFO 1 or FIFO 2, whichever is the more-full FIFO. The inputs and output of the multiplexer 232 each have three bits, the number of bits required to represent the maximum number of entries per cycle.

The $M_{used\_norm}(n+1)$ signal 240 carrying the normalized number of entries in the more-full FIFO at cycle n+1 is calculated using an adder 242. The adder 242 combines two inputs, the $M_{used\_norm}(n)$ signal 212 and the $M_{in}(n)$ signal 230. This completes the calculation of equation 2, $M_{used\_norm}(n+1)$ 240=$M_{used\_norm}(n)$ 212+$M_{in}(n)$ 230. The inputs each have three bits, as discussed above. The output, $M_{used\_norm}(n+1)$ 240, has four bits, because it potentially carries a value of eight.

The number of new entries received for the less-full FIFO L, the $L_{in}(n)$ signal 250, is generated by multiplexer 252 having two inputs, the first connected to the FIFO_2_In signal 236 carrying the number of new entries received for FIFO 2, and the second connected to the FIFO_1_In signal 234 carrying the number of new entries received for FIFO 1. The selector input of the multiplexer 252 is connected to the MSB 222 of the Used_Diff signal 210. Notice that the inputs are simply the reverse of those for multiplexer 232 which calculates the number of new entries received for the more-full FIFO M. Therefore, the $L_{in}(n)$ signal 250 is set to the number of new entries in FIFO 1 or FIFO 2, whichever is the least full FIFO. The inputs and output of the multiplexer 252 each have three bits, the number of bits required to represent the maximum number of entries per cycle. This multiplexer 252 provides the result of equation 3, $L_{used\_norm}(n+1)$, which equals $L_{in}(n)$ 250.

A comparator 262 generates C' 260, the number of unused credits. As mentioned above, this value may be invalid if the difference in entries, Used_Diff 210, is greater than the maximum number of entries per cycle. The comparator 262 has two inputs, $M_{used\_norm}(n+1)$ 240, and $L_{used\_norm}(n+1)$ or $L_{in}(n)$ 250, and an output C' 260 which carries the minimum of the two input values. This completes the calculation of equation 4, C' 260=min ($M_{used\_norm}(n+1)$ 240, $L_{used\_norm}(n+1)$ 250). Although the first input, $M_{used\_norm}(n+1)$ 240, has 4 bits and can carry a value of up to 8, the output C' 260 needs only 3 bits because $L_{in}(n)$ 250 will not have a value greater than 4. Because the comparator 262 passes the minimum of the two input values through to the output, the value on the first input $M_{used\_norm}(n+1)$ 240 could not be selected if it were greater than 4.

The portions of the circuit 200 discussed to this point make up the main logic path for calculating the number of unused credits. Because the values are normalized to the number of entries in the less-full FIFO L, and a minimum number of bits are used throughout the circuit based on the maximum number of new entries per cycle, the resulting number of unused credits in the C' signal 260 may be invalid if the difference Used_Diff 210 between FIFOS is greater than the maximum number of new entries per cycle. A bypass path is provided in the circuit 200 to handle this case. A signal C 270 that is valid for all values of the difference Used_Diff 210 is calculated based on the result C' 260 of the main path and on the result of the bypass path.

The bypass path includes a multiplexer 272 to switch between the result C' 260 of the main path, and the number of new entries in the less-full FIFO L, $L_{in}(n)$ 250. If the difference Used_Diff 210 between FIFOS is greater than the maximum number of new entries per cycle, all new entries will be catch-up entries in the less-full FIFO 1 and therefore do not use any credits. Therefore, the number of unused credits C 270 would equal the number of new entries in the less-full FIFO L, $L_{in}(n)$ 250. The multiplexer 272 therefore has two inputs, one connected to the C' signal 260 and the other connected to the $L_{in}(n)$ signal 250. The multiplexer selector input is connected to a comparator 276 that determines whether the difference Used_Diff 210 its greater than the maximum number of new entries per cycle, in this case four. In this exemplary circuit 200, the comparator 276 is shown as comparing the difference Used_Diff 210 against both positive and negative values, because the Used_Diff signal 210 can be positive or negative depending on which FIFO has more existing entries. Note that this comparator 276 may be implemented in any suitable manner. For example, if the circuit 200 represented numbers using 1's complement notation, the absolute value of the full Used Diff signal 210 may be provided to the comparator 276 by omitting the MSB, bit 7, and comparing only the seven least significant bits against the positive value of the maximum number of new entries per cycle, in this case four.

The comparator 276 examines all bits of the Used_Diff signal 210, so this is one element of the circuit 200 that scales up according to the FIFO depth. However, the output of the circuit 200, the C signal 270, requires only three bits, because the maximum number of new entries per cycle in this case is four. If only four entries can be received in one cycle, only those four can be unused in one cycle, and three binary bits are sufficient to carry the value four.

There is a borderline case when the FIFO difference Used_Diff 210 is equal to the maximum number of new entries per cycle, when both the main path and the bypass path in the circuit 200 produce valid and correct results for the number of unused credits. The comparator 276 may therefore be configured to switch the multiplexer 272 to select either path in this borderline case. In the exemplary circuit 200 illustrated in FIG. 7, the comparator 276 has been configured to select the main path in the borderline case, connecting the C signal 270 to the C' signal 260. In an alternative embodiment, the comparator 276 may be configured to select the bypass path, connecting the C signal 270 to the $L_{in}(n)$ signal 250 in the borderline case, by comparing the Used_Diff signal 210 as "−4>=x>=4" or "−3>x>3", instead of "−4>x>4".

Figure 8:
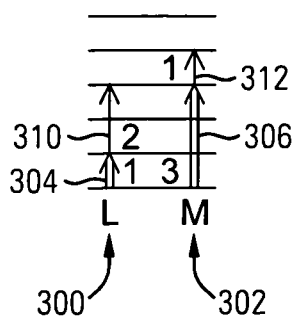
FIG. 8 is an illustration of data entries in a pair of exemplary storage devices, showing catch-up data insertions.

A series of nine exemplary data transmissions is illustrated in FIGS. 8-16 and will now be described to illustrate the operation of the method and apparatus for controlling the flow of data to a pair of storage devices. Referring now to FIG. 8, a data transmission of three new entries is received for storage in a less-full FIFO 300 and a more-full FIFO 302, illustrating the insertion of catch-up entries in the less-full FIFO 300. The less-full FIFO 300 contains one existing entry 304, and the more-full FIFO 302 contains three existing entries 306.

The difference between the two FIFOS 300 and 302 may be calculated in various fashions, as described above. For example, the number of entries may be subtracted, taking one 304 in the less-full FIFO 300 from three in the more-full FIFO 302, for a difference of two. Alternatively, the number of empty slots may be calculated, subtracting the two empty slots in the FIFO 302 with less free space from the four empty slots in the FIFO 300 with more free space, for a difference of two. (The number of empty slots is determined before the new entries 310 and 312 are stored.)

Before the reception of the new data entries, the credit counter would contain two credits, reflecting the available slots in the more-full FIFO 302. The less-full FIFO 300 receives two new entries 310, and the more-full FIFO 302 receives one new entry 312. The two new entries 310 in the less-full FIFO 300 are both catch-up entries, because they are merely catching up to the number of existing entries 302 in the more-full FIFO 302. The two new entries 310 in the less-full FIFO 300 therefore use no credits. The new entry 312 in the more-full FIFO 302 does use one credit, because it is reducing the available space in the more-full FIFO 302. If three credits were sent along with the three new entries 310 and 312, two unused credits should be returned.

Figure 9:
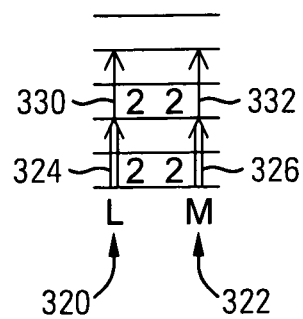
FIG. 9 is an illustration of data entries in a pair of exemplary storage devices, showing redundant data insertions.

Referring now to FIG. 9, a data transmission of four new entries is received for storage in a less-full FIFO 320 and a more-full FIFO 322, illustrating the insertion of redundant entries in the less-full FIFO 320. The less-full FIFO 320 and the more-full FIFO 322 each contain two existing entries 324 and 326. (Note that although the number of existing entries 324 and 326 is equal, one FIFO 322 is designated as the more-full FIFO 322 by default.) The less-full FIFO 320 and the more-full FIFO 322 each receive two new entries 330 and 332. The two new entries 330 in the less-full FIFO 320 are redundant entries to the two new entries 332 in the more-full FIFO 322, because the new entries 330 and 332 are stored in corresponding data slots. The two new entries 330 in the less-full FIFO 320 therefore use no credits. The two new entries 332 in the more-full FIFO 322 do use two credits, because they reduce the available space in the more-full full FIFO 322. Two unused credits should be returned.

Figure 10:
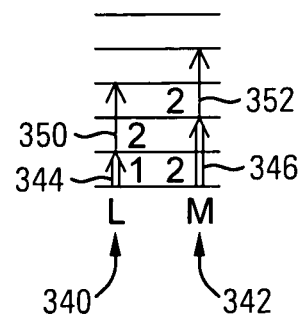
FIG. 10 is an illustration of data entries in a pair of exemplary storage devices, showing a combination of catch-up and redundant data insertions.

Referring now to FIG. 10, a data transmission of four new entries is received for storage in a less-full FIFO 340 and a more-full FIFO 342, illustrating the insertion of a combination of catch-up and redundant entries in the less-full FIFO 340. The less-full FIFO 340 contains one existing entry 344, and the more-full FIFO 342 contains two existing entries 346. The less-full FIFO 340 and the more-full FIFO 342 each receive two new entries 350 and 352. The first of the two new entries 350 in the less-full FIFO 340 is a catch-up entry, because it is catching up to the number of existing entries 346 in the more-full FIFO 342. The second of the two new entries 350 in the less-full FIFO 340 is a redundant entry, because it is matched by a new entry in the more-full FIFO 342. The two new entries 350 in the less-full FIFO 340 therefore use no credits. The two new entries 352 in the more-full FIFO 342 use two credits. Two unused credits should be returned.

Figure 11:
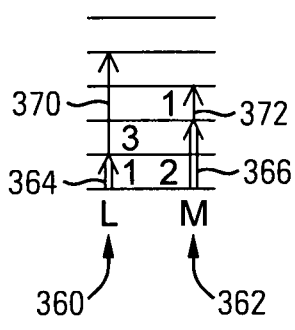
FIG. 11 is an illustration of data entries in a pair of exemplary storage devices, showing a case in which data insertions in one storage device bypass those in another.

Referring now to FIG. 11, a case in which the less-full FIFO 360 passes the more-full FIFO 362 is illustrated. The less-full FIFO 360 contains one existing entry 364, and the more-full FIFO 362 contains two existing entries 366. The less-full FIFO 360 receives three new entries 370, and the more-full FIFO 362 receives one new entry 372. The first of the three new entries 370 in the less-full FIFO 360 is a catch-up entry, and the second is a redundant entry. The third of the three new entries 370 in the less-full FIFO 360 is a new entry that uses a credit.

Conceptually, then, the first two new entries in the less-full FIFO 360 use no credits, the new entry 372 to the more-full FIFO 362 uses one credit, and the third of the three new entries 370 in the less-full FIFO 360 uses one credit. Of course, the exemplary circuit 200 illustrated in FIG. 7 does not add credits used from both of the FIFOS 360 and 362. One FIFO 362 remains designated as the more-full FIFO throughout the entire credit calculation for one cycle, and the correct number of credits to return is calculated for one of the two FIFOS 360 and 362. In this case, two unused credits should be returned. Referring again to FIG. 7 as well as FIG. 11, $M_{used\_norm}(n)$ 212, the normalized number of entries in the more-full FIFO 362, is one, and the number of new entries $M_{in}(n)$ 230 to the more-full FIFO 362 is also one. $M_{used\_norm}(n+1)$ 240 is therefore two. The number of new entries $L_{in}(n)$ 250 to the less-full FIFO 360 is three. Because the minimum of these two values is selected by the comparator 262, the number of unused credits, two, comes from the more-full FIFO 362.

Figure 12:
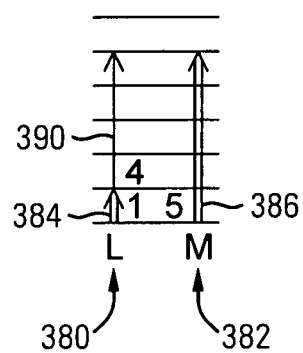
FIGS. 12-14 are illustrations of data entries in a pair of exemplary storage devices, wherein the free space difference in the storage devices is equal to the maximum number of data entries per cycle, showing various combinations of data destinations.

Referring now to FIG. 12, a data transmission of four new entries is received for storage in a Tess-full FIFO 380 and a more-full FIFO 382. In this case the difference in entries or available space between the FIFOS 380 and 382 is equal to the maximum number of new entries per cycle, or four. This is the borderline case discussed above wherein the value for unused credits calculated through the main path and the bypass path are both correct and valid. The less-full FIFO 380 contains one existing entry 384, and the more-full FIFO 382 contains five existing entries 386. The less-full FIFO 380 receives four new entries 390, and the more-full FIFO 382 receives none. Note that the four new entries 390 are all catch-up entries, so the number of unused credits is four. Referring again to FIG. 7 as well as FIG. 12, $M_{used\_norm}(n)$ 212 is four and $M_{in}(n)$ 230 is zero. $M_{used\_norm}(n+1)$ 240 is therefore four. The number of new entries $L_{in}(n)$ 250 to the less-full FIFO 380 is also four. The comparator 262 therefore presents the value four to the first input of the bypass multiplexer 272, and the bypass value provided by $L_{in}(n)$ 250 is also four. The bypass multiplexer 272 may select either the value from the main logic path or the bypass path, because each produce a correct and valid result in this borderline case.

Figure 13:
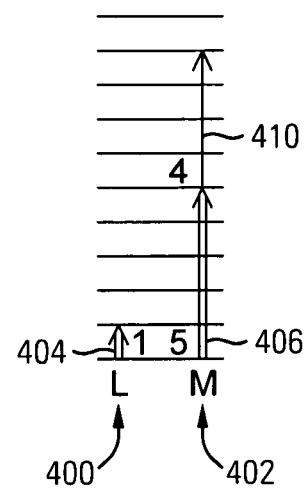

Referring now to FIG. 13, a case is illustrated showing the need for the extra bit in the output of the adder 242 in the circuit 200 of FIG. 7. The less-full FIFO 400 contains one existing entry 404, and the more-full FIFO 402 contains five existing entries 406. The less-full FIFO 400 receives no new entries, and the more-full FIFO 402 receives four new entries 410. All four new entries 410 in the more-full FIFO 402 use a credit, so no credits are returned. Referring again to FIG. 7 as well as FIG. 13, both $M_{used\_norm}(n)$ 212 and $M_{in}(n)$ 230 are four, requiring only three binary bits each. $M_{used\_norm}(n+1)$ 240 is therefore eight, which requires four binary bits as shown in FIG. 7.

Figure 14:
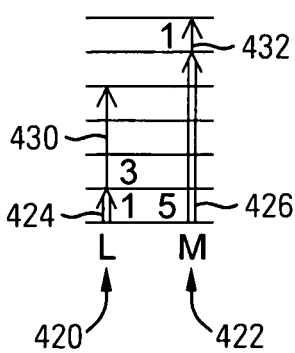

FIG. 14 illustrates another example of the borderline case wherein the difference in entries or available space between the FIFOS 420 and 422 is equal to the maximum number of new entries per cycle, or four. The less-full FIFO 420 contains one existing entry 424, and the more-full FIFO 422 contains five existing entries 426. The less-full FIFO 420 receives three new entries 430, and the more-full FIFO 422 receives one new entry 432. Referring again to FIG. 7 as well as FIG. 14, $M_{used\_norm}(n)$ 212 is four and $M_{in}(n)$ 230 is one. $M_{used\_norm}(n+1)$ 240 is therefore five. The number of new entries $L_{in}(n)$ 250 to the less-full FIFO 420 is three. The comparator 262 therefore produces the lesser of these values, three, as the number of unused credits. (Again, this value would be produced whether the main logic path or the bypass path were selected.)

Figure 15:
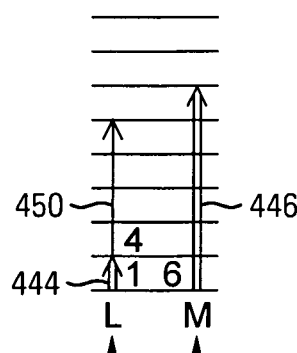
FIG. 15 is an illustration of data entries in a pair of exemplary storage devices, showing operation of a bypass path, wherein the value calculated by the main logic path is valid.

Referring now to FIG. 15, a case requiring the bypass path will be described. The less-full FIFO 440 contains one existing entry 444, and the more-full FIFO 442 contains six existing entries 446. Note that the difference between the FIFO entries, five, is greater than the maximum number of entries per cycle, four. Note also that, although the difference is greater than the maximum new entries, the value five can be stored in the three binary bits included for the $M_{used\_norm}(n)$ signal 212 in the circuit 200 of FIG. 7. The less-full FIFO 440 receives four new entries 450, and the more-full FIFO 442 receives none. Referring again to FIG. 7 as well as FIG. 15, $M_{used\_norm}(n)$ 212 is five, and $M_{in}(n)$ 230 is zero. $M_{used\_norm}(n+1)$ 240 is therefore five. The number of new entries $L_{in}(n)$ 250 to the less-full FIFO 440 is four. The comparator 262 therefore produces the lesser of these values, four, as the number of unused credits. Because the difference between the FIFO entries is greater than the maximum number of entries per cycle, the bypass path is selected and the number of unused credits is set equal to the number of new entries $L_{in}(n)$ 250 in the less-full FIFO 440, or four. However, in this case, the value calculated in the main logic path was also valid because the values just happened to fit into the existing number of bits in the exemplary circuit 200. A contrasting case in which the value calculated in the main logic path is not valid will be described with respect to FIG. 16.

Figure 16:
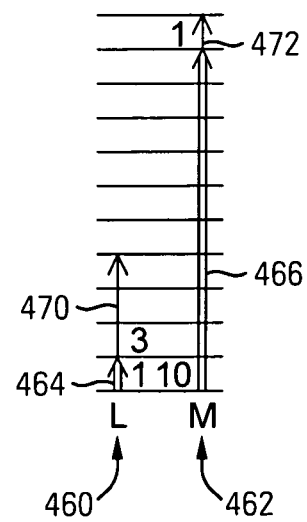
FIG. 16 is an illustration of data entries in a pair of exemplary storage devices, showing operation of a bypass path, wherein the value calculated by the main logic path is invalid.

Referring now to FIG. 16, the less-full FIFO 460 contains one existing entry 464, and the more-full FIFO 462 contains ten existing entries 466. Note that the difference between the FIFO entries, nine, is greater than the maximum number of entries per cycle, four. Note also that the difference value, nine, cannot be stored in the three binary bits included for the $M_{used\_norm}(n)$ signal 212 in the circuit 200 of FIG. 7. The less-full. FIFO 460 receives three new entries 470, and the more-full FIFO 462 receives one 472. Referring again to FIG. 7 as well as FIG. 16, $M_{used\_norm}(n)$ 212 is nine, or "1001" in binary. Because the $M_{used\_norm}(n)$ signal has only three bits, the most significant bit is truncated, leaving a binary value of "001", or one $M_{in}(n)$ 230 is one. $M_{used\_norm}(n+1)$ 240 is therefore two. The number of new entries $L_{in}(n)$ 250 to the less-full FIFO 460 is three. The comparator 262 therefore produces the lesser of these values, two, as the number of unused credits. Because the difference between the FIFO entries is greater than the maximum number of entries per cycle, the bypass path is selected and the number of unused credits is set equal to the number of new entries $L_{in}(n)$ 250 in the less-full FIFO 460, or three. In this case, the value calculated in the main logic path, two, is invalid because a value was truncated due to the lack of bits. The bypass path correctly compensated for this invalid result in the main logic path.

The method and apparatus described herein thus controls the flow of data to a pair of storage devices using a small and efficient circuit and/or storage registers, greatly reducing the effect of the depth of the storage devices on the apparatus.

Although the exemplary embodiment described above supports multiple new entries per cycle using multi-port FIFOS, the method and apparatus for controlling the flow of data to a pair of storage devices is equally applicable to systems in which only one new entry per cycle is transmitted.

An exemplary embodiment of the apparatus for controlling the flow of data to a pair of storage devices may comprise computer readable program code stored on at least one computer readable medium for execution in a processor (e.g., 170) such as that illustrated in FIG. 6. The exemplary computer readable program code includes code for calculating a difference in free space between a storage device with less free space and a storage device having more free space, and code for calculating a sum of the difference and a number of new entries to the storage device having less free space. The computer readable program code also includes code for setting a minimum value to the smaller of the sum and a number of new entries to the storage device having more free space, and code for setting the number of unused credits to the minimum value if the difference is not greater than a threshold value, and for setting the number of unused credits to the number of new entries to the storage device having more free space if the difference is greater than a threshold value.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store the code or instructions for use by or in connection with the instruction-executing device. For example, the storage medium may include (but is not limited to) any electronic, magnetic, optical, or other storage device. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method, the method comprising:
   in a given data transmission cycle, receiving a data transmission of at least one new entry;
   storing a first number of the at least one new entry in a first storage device having a first available storage capacity for storing entries of the given data transmission and a second number of the at least one new entry in a second storage device having a second available storage capacity for storing entries of the given data transmission;

determining a number of credits used by the given data transmission based on the first and second numbers and a difference between the first and second available storage capacities; and using the determined number of credits to control flow of entries in another data transmission cycle following the given data transmission.

2. The method of claim 1, wherein the first storage device has a first maximum storage capacity and the second storage device has a second maximum storage capacity, and further comprising initializing a credit count with a smallest one of the first and second maximum storage capacities.

3. The method of claim 2, further comprising decrementing the credit count for each of said at least one new entries.

4. The method of claim 1, further comprising determining the difference between the first and second available storage capacities based on a difference between a number of existing entries stored in said first storage device and a number of existing entries stored in said second storage device.

5. The method of claim 1, further comprising determining the difference between the first and second available storage capacities based on a difference between a number of free spaces available in said first storage device from a number of free spaces available in said second storage device.

6. The method of claim 1, wherein the determining of the number of credits used by the given data transmission is based on magnitude of the difference between the first and second available storage capacities.

7. The method of claim 1, wherein the determining comprises determining which of the first and second storage devices has more free space and which has less free space.

8. The method of claim 7, wherein the determining comprises adding the number of entries stored in the one of the first and second storage devices having less free space to the difference between the first and second available storage capacities.

9. The method of claim 8, wherein the determining comprises identifying a minimum of a result of said adding and said number of entries stored in the one of the first and second storage devices having more free space.

10. The method of claim 9, wherein the determining comprises determining whether the difference between the first and second available storage capacities is greater than a threshold value, wherein if the difference is greater than said threshold value, said number of credits used is equal to a quantity of said at least one entry minus said number of entries made to said storage device having more free space, and if said difference is not greater than said threshold value, said number of credits used is equal to said quantity of said at least one entry minus said minimum.

11. The method of claim 10, wherein said threshold value is equal to a maximum number of entries that can be received in one data transmission cycle.

12. The method of claim 10, wherein said threshold value is equal to a maximum number of entries that can be received in one data transmission cycle minus one.

13. The method of claim 1, further comprising sending an indication of said number of credits used to a source of the data transmission.

14. The method of claim 1, further comprising sending an indication of a number of credits not used by the data transmission, wherein said number of credits not used is equal to a quantity of said at least one entry minus said number of credits used.

15. At least one non-transitory computer-readable medium having processor-readable program code embodied therein, the processor-readable program code adapted to be executed by a processor to implement a method comprising:

in a given data transmission cycle, receiving a data transmission of at least one new entry;

storing a first number of the at least one new entry in a first storage device having a first available storage capacity for storing entries of the given data transmission and a second number of the at least one new entry in a second storage device have a second available storage capacity for storing entries of the given data transmission;

determining a number of credits used by the given data transmission based on the first and second numbers and a difference between the first and second available storage capacities; and using the determined number of credits to control flow of entries in another data transmission cycle following the given data transmission.

16. The computer-readable medium of claim 15, the first storage device has a first maximum storage capacity and the second storage device has a second maximum storage capacity, and the method further comprises initializing a credit count with a smallest one of the first and second maximum storage capacities.

17. The computer-readable medium of claim 15, wherein the method further comprises transmitting said number of unused credits to a source of the data transmission, wherein a credit counter is incremented by said number of unused credits.

18. The computer-readable medium of claim 17, wherein no more data entries are transmitted for storage in said pair of storage devices than a number of credits in said credit counter.

19. Apparatus, comprising:

a memory storing processor-readable instructions; and a processor coupled to the memory, operable to execute the instructions, and based at least in part on the execution of the instructions operable to perform operations comprising in a given data transmission cycle, receiving a data transmission of at least one new entry;

storing a first number of the at least one new entry in a first storage device having a first available storage capacity for storing entries of the given data transmission and a second number of the at least one new entry in a second storage device have a second available storage capacity for storing entries of the given data transmission;

determining a number of credits used by the given data transmission based on the first and second numbers and a difference between the first and second available storage capacities; and using the determined number of credits to control flow of entries in another data transmission cycle following the given data transmission.

* * * * *

UNITED STATES PATENT AND TRADEMARK OFFICE
CERTIFICATE OF CORRECTION

PATENT NO.        : 8,924,662 B2
APPLICATION NO.   : 12/100013
DATED             : December 30, 2014
INVENTOR(S)       : Brian William Hughes et al.

Page 1 of 1

It is certified that error appears in the above-identified patent and that said Letters Patent is hereby corrected as shown below:

In the Claims

In column 16, line 11, in Claim 15, delete "entry," and insert -- entry; --, therefor.

Signed and Sealed this
Twenty-eighth Day of April, 2015

Michelle K. Lee
*Director of the United States Patent and Trademark Office*